(12) United States Patent
Roh (10) Patent No.: US 11,785,050 B2
(45) Date of Patent: Oct. 10, 2023

(54) SECURITY MANAGEMENT SYSTEM FOR REMOTE WORKING ENVIRONMENT, COMPUTER PROGRAM THEREFOR, AND METHOD THEREFOR

(71) Applicant: Somma, Inc., Seongnam-si (KR)

(72) Inventor: Yonghwan Roh, Yongin-si (KR)

(73) Assignee: Somma, Inc., Seongnam-si (KR)

( * ) Notice: Subject to any disclaimer, the term of this patent is extended or adjusted under 35 U.S.C. 154(b) by 178 days.

(21) Appl. No.: 17/474,420

(22) Filed: Sep. 14, 2021

(65) Prior Publication Data

US 2022/0109698 A1  Apr. 7, 2022

(30) Foreign Application Priority Data

Oct. 7, 2020  (KR) .......................... 10-2020-0129324

(51) Int. Cl.
| | |
|---|---|
| *H04L 29/06* | (2006.01) |
| *H04L 9/40* | (2022.01) |
| *G06N 20/00* | (2019.01) |

(52) U.S. Cl.
CPC ............. *H04L 63/20* (2013.01); *G06N 20/00* (2019.01); *H04L 63/101* (2013.01); *H04L 63/1425* (2013.01)

(58) Field of Classification Search
CPC ... H04L 63/20; H04L 63/101; H04L 63/1425; H04L 63/145; H04L 63/1466; H04L 63/126

USPC ............................................................. 726/1
See application file for complete search history.

(56) References Cited

U.S. PATENT DOCUMENTS

| | | | |
|---|---|---|---|
| 9,560,072 B1* | 1/2017 | Xu ........................... | H04L 41/12 |
| 11,050,714 B2* | 6/2021 | Weisshaupt ......... | H04L 63/1416 |
| 2019/0089677 A1* | 3/2019 | Ashley ................ | H04L 63/0263 |
| 2019/0340353 A1* | 11/2019 | Mitelman ............. | G06F 21/554 |

FOREIGN PATENT DOCUMENTS

KR  10-1067686 B1  9/2011

* cited by examiner

*Primary Examiner* — Longbit Chai
(74) *Attorney, Agent, or Firm* — Studebaker & Brackett PC (57) ABSTRACT

A security management system for a remove working environment, a computer program therefor, and a method therefor are provided. The security management system monitors and tracks a behavior of an endpoint in real time after execution of a process or a network access time point. Furthermore, the security management system monitors a behavior of an operating system level on the endpoint to which the security policy is not applied in real time to detect a behavior which threatens the security management system and controls the endpoint. Furthermore, the security management system corrects and manages the security policy in response to a request about exception application of a predetermined security policy in real time to flexibly perform security management of the endpoint.

15 Claims, 8 Drawing Sheets

Allowable execution program ANY   Policy correction   Execution program   (Policy creation)

| Program name | Electronic signature valid value | Electronic signer | Policy creation time | Policy correction time | Allowable temporary start time | Allowable temporary end time | Person who creates policy | Allowable or not valid value | Policy enable |
|---|---|---|---|---|---|---|---|---|---|
| GUpdate.exe | Trusted | G Inc | 2020.07.20 00:14:55 | 2020.07.21 11:33:40 | N/A | N/A | Sommaine | ◯ | ◯ |
| UBypass.exe | Unknown | | 2020.07.20 20:17:25 | 2020.07.20 20:17:25 | N/A | N/A | Sommaine | ◯ | ◯ |
| UBypass.exe | Nosignature | | 2020.07.20 00:14:55 | 2020.07.21 11:33:40 | N/A | N/A | Sommaine | ◯ | ◯ |
| UBypass.exe | Badsignature | | 2020.07.20 00:14:55 | 2020.07.21 11:33:40 | N/A | N/A | Sommaine | ◯ | ◯ |
| UBypass.exe | Distrust | | 2020.07.20 00:14:55 | 2020.07.21 11:33:40 | N/A | N/A | Sommaine | ◯ | ◯ |
| UBypass.exe | Expired | | 2020.07.20 00:14:55 | 2020.07.21 11:33:40 | N/A | N/A | Sommaine | ◯ | ◯ |
| UBypass.exe | Revoked | | 2020.07.20 00:14:55 | 2020.07.21 11:33:40 | N/A | N/A | Sommaine | ◯ | ◯ |
| pytton.exe | Trusted | Psoftware | 2020.07.20 00:14:55 | 2020.07.21 11:33:40 | N/A | N/A | Sommaine | ◯ | ◯ |
| prl_net.exe | Trusted | Parallels | 2020.07.20 00:14:55 | 2020.07.21 11:33:40 | N/A | N/A | Sommaine | ◯ | ◯ |
| UBypass.exe | Unknown | N/A | 2020.07.20 00:14:55 | 2020.07.21 11:33:40 | N/A | N/A | Sommaine | ◯ | ◯ |
| UBypass.exe | Nosignature | N/A | 2020.07.20 00:14:55 | 2020.07.21 11:33:40 | N/A | N/A | Sommaine | ◯ | ◯ |
| vmsdtool.exe | Trusted | VM Inc | 2020.07.20 00:14:55 | 2020.07.21 11:33:40 | N/A | N/A | Sommaine | ◯ | ◯ |

FIG. 4

| Program policy creation | ✕ |
|---|---|

Program name
GUpdate.exe

Program electronic signature valid value
Trusted

Program electronic signer
G LLC

☑ Allowable
☑ Policy enable ( Store )  ( Cancel )

FIG. 5

Allowable/blocked access site  ANY   Policy correction   Access site                              (Policy creation)

| Domain name | Policy creation time | Policy correction time | Allowable temporary start time | Allowable temporary end time | Allowable Person who creates policy | Allowable or not valid value | Policy enable |
|---|---|---|---|---|---|---|---|
| ap.com | 2020.07.19 15:09:52 | 2020.07.19 15:09:52 | N/A | N/A | Agent Default Allow Policy | ◯ | ◯ |
| as.com | 2020.07.19 15:09:52 | 2020.07.19 15:09:52 | N/A | N/A | Agent Default Allow Policy | ◯ | ◯ |
| c.com | 2020.07.19 15:09:53 | 2020.07.19 15:09:53 | N/A | N/A | Agent Default Allow Policy | ◯ | ◯ |
| ae.com | 2020.07.19 15:11:29 | 2020.07.19 15:11:29 | N/A | N/A | Agent Default Allow Policy | ◯ | ◯ |
| bi.com | 2020.07.19 15:11:37 | 2020.07.19 15:11:37 | N/A | N/A | Agent Default Allow Policy | ◯ | ◯ |
| n.com | 2020.07.19 15:11:40 | 2020.07.19 15:11:40 | N/A | N/A | Agent Default Allow Policy | ◯ | ◯ |
| ed.com | 2020.07.19 15:40:44 | 2020.07.19 15:40:44 | N/A | N/A | Agent Default Allow Policy | ◯ | ◯ |
| da.net | 2020.07.19 15:12:02 | 2020.07.19 15:12:02 | N/A | N/A | Agent Default Allow Policy | ◯ | ◯ |
| da.net | 2020.07.19 15:12:04 | 2020.07.19 15:12:04 | N/A | N/A | Agent Default Allow Policy | | ◯ |
| t1.net | 2020.07.19 15:12:05 | 2020.07.19 15:12:05 | N/A | N/A | Agent Default Allow Policy | | ◯ |
| st.net | 2020.07.19 15:12:07 | 2020.07.19 15:12:07 | N/A | N/A | Agent Default Allow Policy | | ◯ |

SECURITY MANAGEMENT SYSTEM FOR REMOTE WORKING ENVIRONMENT, COMPUTER PROGRAM THEREFOR, AND METHOD THEREFOR

CROSS-REFERENCE TO RELATED APPLICATIONS

A claim for priority under 35 U.S.C. § 119 is made to Korean Patent Application No. 10-2020-0129324 filed on Oct. 7, 2020 in the Korean Intellectual Property Office, the entire contents of which are hereby incorporated by reference.

BACKGROUND

Embodiments of the inventive concept described herein relate to a security management system for a remove working environment, a computer program therefor, and a method therefor.

Recently, with the development of communication technology, working environments of workers have deviated a lot from the existing spatial constraints and have been diversified in type and form. If a worker only has advanced digital equipment such as a portable phone, a smartphone, a laptop, or a personal digital assistant (PDA), he or she is able to work anywhere outside of the enterprise, company, or the like to which he or she belongs.

Particularly, as many enterprises which have used an existing local network have established a working environment over a cloud network, there has been an increase in the number of workers who work in a remote working environment. In addition, as highly contagious diseases such as Corona and MERS become prevalent, this remote working environment has now become an essential element for many companies.

However, there is a problem occurring due to such a remote working environment. This is security management of an enterprise system. Because intrusion of a main server is virtually impossible, cases of intrusion into the system through each remote place of work corresponding to the endpoint are gradually increasing.

Thus, many enterprises have established and applied a security policy for protecting their own systems. However, such a security policy controls each endpoint at only a time when program execution or network access is performed in the endpoint and does not manage a behavior of the endpoint in real time.

Particularly, because it is difficult to apply a security policy of the enterprise to a process associated with an operating system of the endpoint, there is a need for a security management for effectively controlling a threat behavior through such an operating system program.

SUMMARY

Embodiments of the inventive concept provide a security management system for a remote working environment, a computer program therefor, and a method therefor.

Herein, problems to be solved by the inventive concept are not limited to the above-mentioned problems, and other problems may be present.

According to an embodiment, a security management system for a remote working environment to manage a threat behavior of an endpoint in the remote working environment may include a security management server and a control agent that controls a real-time behavior in an endpoint terminal, based on information associated with a security policy provided from the security management server. The security management server may include a collection unit that collects information associated with a real-time behavior in at least one endpoint terminal, a memory that stores and manages the security policy, and a controller that applies the security policy stored in the memory to the control agent in real time and determines whether the real-time behavior in the endpoint terminal is a threat behavior based on the collected information. The control agent may control a real-time behavior about a process in the endpoint terminal based on a whitelist of the security policy and may control network access in the endpoint terminal based on a blacklist of the security policy.

In some embodiments of the inventive concept, the controller may analyze whether the real-time behavior in the endpoint terminal is a threat behavior based on a process behavior in the endpoint terminal, based on the collected information. The control agent may control a threat behavior in the endpoint terminal based on the analyzed result of the controller.

In some embodiments of the inventive concept, the controller may detect a threat behavior through a required program of an operating system by means of a machine learning-based threat hunting technology.

In some embodiments of the inventive concept, the collection unit may collect a behavior pattern associated with a domain generation algorithm (DGA) in the endpoint terminal, based on a DGA detection algorithm.

In some embodiments of the inventive concept, the controller may correct an existing security policy in real time based on a received exception policy request, when the exception policy request about the security policy is received from the endpoint terminal.

According to an embodiment, a security management method for a remote working environment may include presetting a security policy associated with control of a real-time behavior in an endpoint terminal, applying the security policy to a control agent in real time, and controlling the real-time behavior in the endpoint terminal, based on the security policy. The security policy may include a whitelist associated with a real-time behavior about a process in the endpoint terminal and a blacklist about a network in the endpoint terminal. The controlling of the real-time behavior in the endpoint terminal may include controlling the real-time behavior about the process in the endpoint terminal based on the whitelist of the security policy and controlling network access in the endpoint terminal based on the blacklist of the security policy.

In some embodiments of the inventive concept, the security management method may further include collecting real-time behavior information in an endpoint and analyzing whether a real-time behavior in the endpoint terminal is a threat behavior, based on the collected behavior information. The controlling of the real-time behavior may include controlling a real-time behavior corresponding to a threat behavior in the endpoint terminal based on the analyzed result.

In some embodiments of the inventive concept, the collecting of the real-time behavior in the endpoint terminal may include collecting a behavior pattern associated with a domain generation algorithm (DGA) in the endpoint terminal, based on a DGA detection algorithm.

In some embodiments of the inventive concept, the analyzing of whether the real-time behavior in the endpoint terminal is the threat behavior may include detecting whether the real-time behavior in the endpoint terminal is a threat behavior through a required program of an operating system by means of a machine learning-based threat hunting technology.

In some embodiments of the inventive concept, the security management method may further include receiving an exception policy request about the security policy from the endpoint terminal and correcting the security policy in real time in response to the exception policy request.

According to an embodiment, a computer program stored in a computer-readable storage medium, when executed by one or more processors, may perform a plurality of processes for security management for a remote working environment. The plurality of processes may include a first process that presets a security policy associated with control of a real-time behavior in an endpoint terminal, a second process that applies the security policy to a control agent in real time, and a third process that controls the real-time behavior in the endpoint terminal, based on the security policy. The security policy may include a whitelist associated with a real-time behavior about a process in the endpoint terminal and a blacklist about a network in the endpoint terminal. The third process may control the real-time behavior about the process in the endpoint terminal based on the whitelist of the security policy and may control network access in the endpoint terminal based on the blacklist of the security policy.

In some embodiments of the inventive concept, the plurality of processes may further include a fourth process that collects real-time behavior information in an endpoint and a fifth process that analyzes whether a real-time behavior in the endpoint terminal is a threat behavior, based on the collected behavior information.

In some embodiments of the inventive concept, the fourth process may collect a behavior pattern associated with a domain generation algorithm (DGA) in the endpoint terminal, based on a DGA detection algorithm.

In some embodiments of the inventive concept, the third process may control a real-time behavior corresponding to a threat behavior in the endpoint terminal based on the analyzed result.

In some embodiments of the inventive concept, the fifth process may detect whether the real-time behavior in the endpoint terminal is a threat behavior through a required program of an operating system by means of a machine learning-based threat hunting technology.

In some embodiments of the inventive concept, the plurality of processes may further include a sixth process that receives an exception policy request about the security policy from the endpoint terminal and a seventh process that corrects the security policy in real time in response to the exception policy request.

The other details of the inventive concept may be included in the detailed description and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

The word "exemplary" is to mean serving as an example, instance, or illustration in the specification. Any embodiment described in the specification as "exemplary" is not necessarily to be construed as preferred or advantageous over other embodiments.

Furthermore, the term "unit" as used herein means, but is not limited to, a software or hardware component, such as field-programmable gate array (FPGA) or application-specific integrated circuit (ASIC), which performs certain tasks. However, the "unit" is not limited to software or hardware. The "unit" may be configured to reside on the addressable storage medium and configured to execute on one or more processors. Thus, as an example, the "unit" may include elements, such as software elements, object-oriented software elements, class elements and task elements, processes, functions, attributes, procedures, subroutines, segments of program codes, drivers, firmware, microcode, circuitry, data, databases, data structures, tables, arrays, and variables. The functionality provided for in the elements and "unit" or may be combined into fewer elements and "units" or further separated into additional elements and "units".

Furthermore, all "units" of the specification may be controlled by at least one processor, and at least one processor may perform an operation performed by the "unit" of the inventive concept.

Embodiments of the inventive concept may be described in terms of a function or a block performing the function. The block, which may be referred to herein as the 'unit' or 'module' of the inventive concept is physically implemented by analog and/or digital circuits such as logic gates, integrated circuits, microprocessors, microcontrollers, memories, passive electronic components, active electronic components, optical components, and hardwired circuits, and may optionally be driven by firmware and software.

An embodiment of the inventive concept may be implemented using at least one software program run on at least one hardware device and may perform a network management function for controlling elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Figure 1:
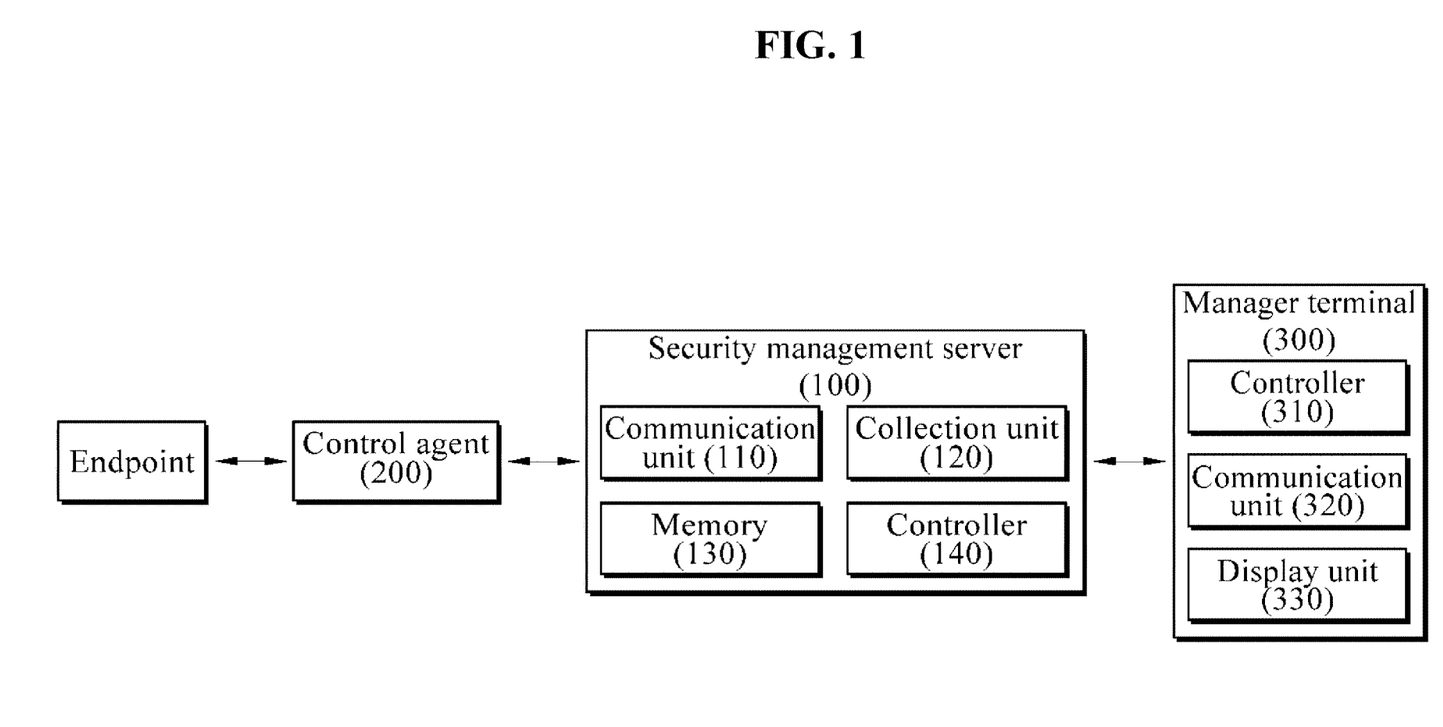
FIG. 1 is a block diagram illustrating a configuration of a security management system for a remote working environment according to an embodiment of the inventive concept.

FIG. 1 is a block diagram schematically illustrating a configuration of a security management system for a remote working environment according to an embodiment of the inventive concept.

The security management system for the remote working environment to manage a threat behavior of an endpoint in the remote working environment may include a security management server 100 and a control agent 200.

The control agent 200 may be a security management agent which is installed in an endpoint terminal to detect and control a real-time behavior of the endpoint, which may control a real-time behavior in the endpoint terminal based on information associated with a security policy provided from the security management server 100.

The control agent 200 may correspond to, but is not limited to, a program, an application, or the like provided from the security management server 100 of the security management system.

As an example, the control agent 200 may be an agent based on an endpoint detection and response (EDR) solution which detects, analyzes, or correspond to an event occurring in the endpoint terminal in real time. However, this is not limited thereto.

Meanwhile, the endpoint may refer to a user who is a final destination connected with the security management server 100 over a network. In detail, the endpoint may refer to a user, a worker, or the like in a remote place of work spatially separated from the security management server 100 in the specification.

An endpoint terminal may refer to a terminal used by the worker or the user on the endpoint. A manager terminal 300 described in the specification may include, for example, a mobile phone, a smartphone, a laptop computer, a digital broadcast terminal, personal digital assistants (PDA), a portable multimedia player (PMP), a navigation, slate PC, a tablet PC, an ultrabook, a wearable device (e.g., a smartwatch, a smart glass, or a head mounted display (HMD)), or the like.

FIG. 1 is a block diagram illustrating a configuration of a security management system for a remote working environment according to an embodiment of the inventive concept.

Referring to FIG. 1, the security management server 100 may include a communication unit 110, a collection unit 120, a memory 130, and a controller 140. Hereinafter, all operations of the security management server 100, described in an embodiment of the inventive concept, may be performed in the same manner as those in the controller 140.

The communication unit 110 may communicate with each endpoint terminal and may communicate with the manager terminal 300 of the security management server 100. As an example of the inventive concept, the communication unit 110 may receive a request about exception application of a security policy from each endpoint terminal. Furthermore, the communication unit 110 may receive information about the security policy, which is previously set in conjunction with the security policy, from the manager terminal 300 and may store the received information in the memory 130. Meanwhile, the communication unit 110 may receive a response about correction of the security policy from the manager terminal 300 in response to the request about the exception application of the security policy, which is received from the above-mentioned endpoint terminal.

Such a communication unit 110 may include at least one of a mobile communication module and a wireless Internet module. The mobile communication module may transmit and receive a radio signal with at least one of a base station, an external terminal, or an external server on a mobile communication network established according to technical standards or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like) for mobile communication.

The radio signal may include a voice call signal, a video call signal, or various types of data according to text/multimedia message transmission and reception.

The wireless Internet module may refer to a module for wireless Internet access, which may be internally or externally mounted on the security management server 100. The wireless Internet module may be implemented to transmit and receive a radio signal over a communication network according to wireless Internet technologies.

The wireless Internet technology may be, for example, a wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like. The wireless Internet module may transmit and receive data depending on at least one wireless Internet technology in the range of including an Internet technology which is not listed.

From a point of view that wireless Internet access by WiBro, HSDPA, HSUPA, GSM, CDMA, WCDMA, LTE, LTE-A, or the like is performed over a mobile communication network, the wireless Internet module which performs wireless Internet access over the mobile communication network may be understood as a kind of the mobile communication module.

The collection unit 120 may collect information associated with a real-time behavior in at least one endpoint terminal. In this case, the information associated with the real-time behavior in the endpoint terminal may be collected through the communication unit 110 of the security management server 100.

Meanwhile, as an embodiment of the inventive concept, the collection unit 120 may collect a behavior pattern associated with a domain generation algorithm (DGA) in the endpoint terminal, based on a DGA detection algorithm.

When discovering a malicious code (malware), a server, a security manager, or the like takes action of blocking an IP address, a domain address, or the like of a command & control (C&C) server, which is hard coded in the malicious code, using security equipment such as a firewall.

However, recently, there has been an increase in cases of attempting to access the C&C server by means of the DGA, specifically, by attempting to access a domain address generated by the DGA and bypassing "access prevention". Thus, the collection unit 120 may collect a DGA-related behavior pattern in the endpoint terminal, based on the DGA detection algorithm.

As an example of the inventive concept, the memory 130 of the security management server 100 may store and manage a DGA algorithm used to collect the DGA-related behavior pattern.

Meanwhile, the memory 130 of the security management server 100 may store and manage information about a predetermined security policy.

The controller 140 may apply the security policy stored in the memory 130 to a control agent 200 of each endpoint terminal in real time. Hereinafter, a security management method of the endpoint terminal based on the security policy will be described.

Figure 2:
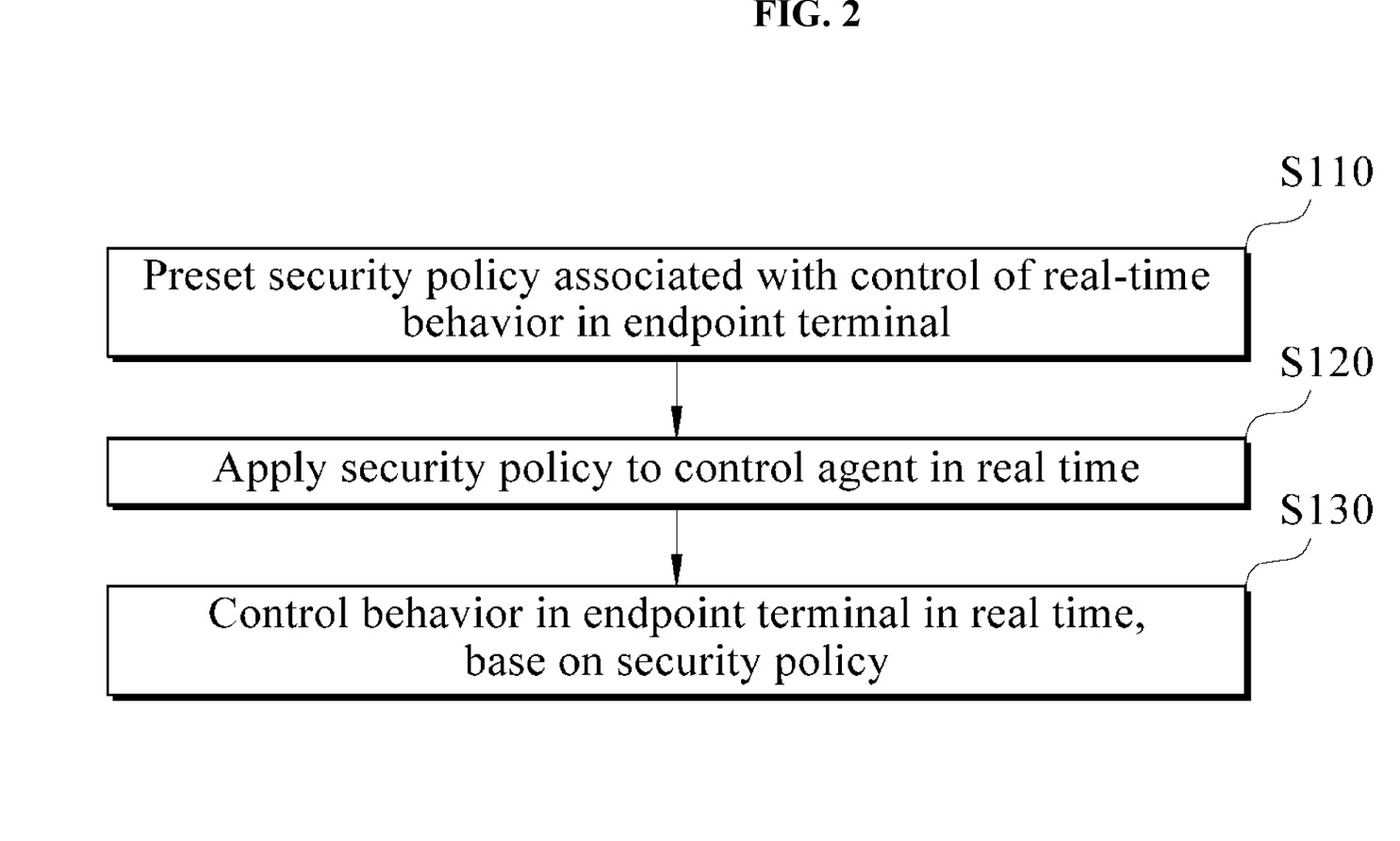
FIG. 2 is a flowchart illustrating a process of controlling a behavior in an endpoint terminal in a real time based on a security policy according to an embodiment of the inventive concept.

FIG. 2 is a flowchart illustrating a process of controlling a behavior in an endpoint terminal in a real time based on a security policy according to an embodiment of the inventive concept.

First of all, referring to FIG. 2, in operation S110, a controller 140 of a security management server 100 of FIG. 1 may preset a security policy associated with control of a real-time behavior in an endpoint terminal.

In detail, the security management server 100 may receive the preset security policy from a manager terminal 300 of FIG. 1 and may store the security policy in a memory 130 of FIG. 1.

Meanwhile, the security policy may include whitelist information about a process of the endpoint terminal. In other words, the security policy may include information about an allowable program executable in the endpoint terminal.

Figure 3:
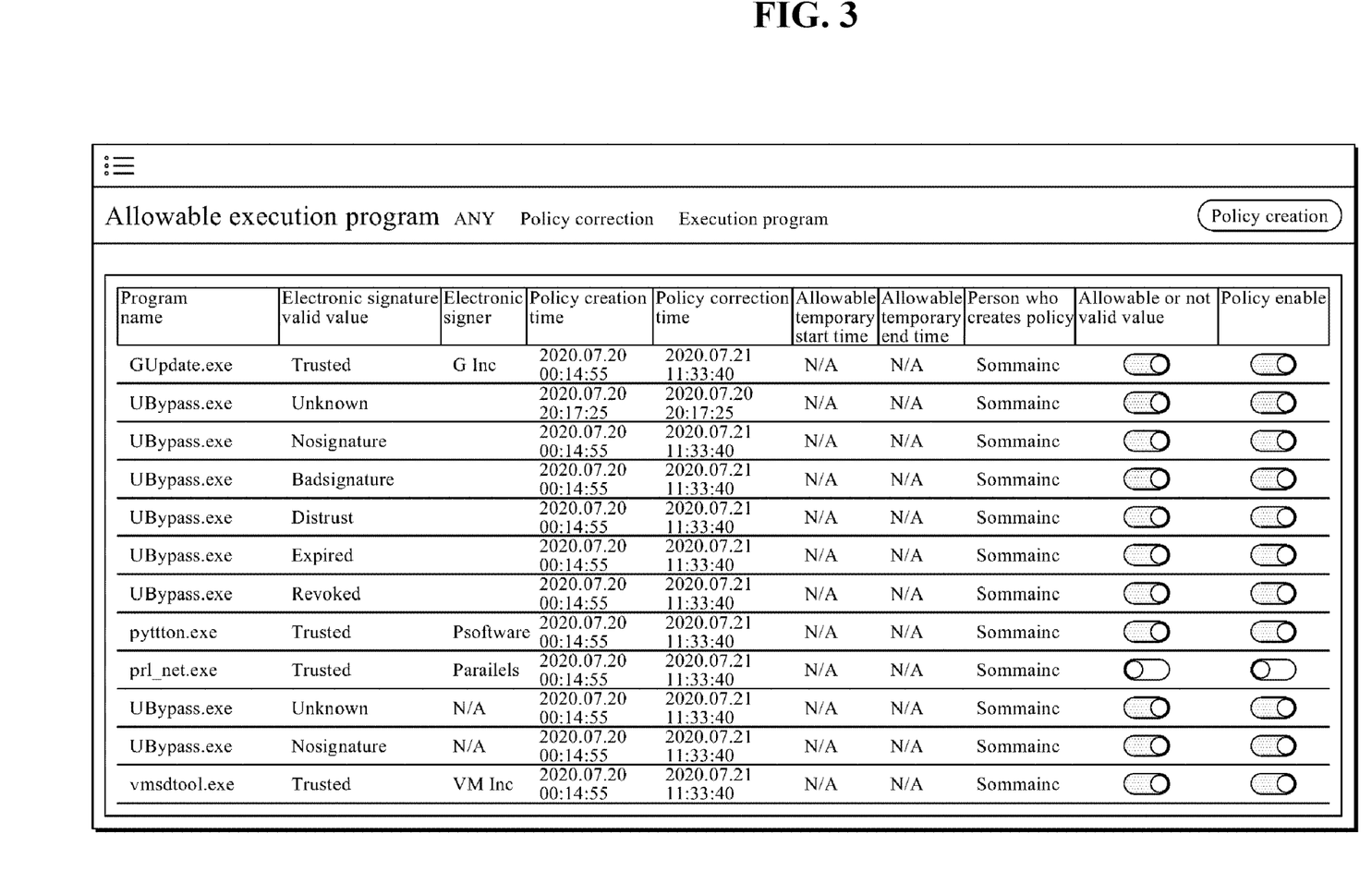
FIG. 3 is a drawing illustrating a security policy of controlling program execution of an endpoint according to an embodiment of the inventive concept.

FIG. 3 is a drawing illustrating a security policy of controlling program execution of an endpoint according to an embodiment of the inventive concept.

In detail, referring to FIG. 3, the security policy may include a whitelist together with pieces of information about a program name, an electronic signature valid value, an electronic signer, a policy creation time, a policy correction time, and the like of an allowable execution program, which correspond to the whitelist.

Figure 4:
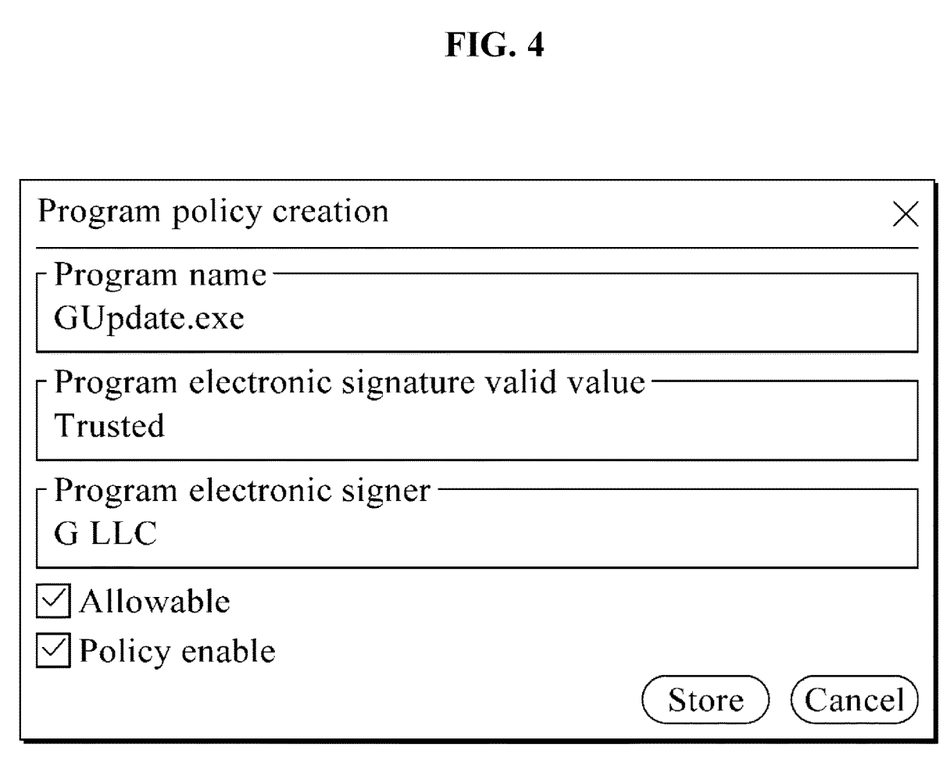
FIG. 4 is a drawing illustrating generating a security policy of controlling program execution of an endpoint according to an embodiment of the inventive concept.

FIG. 4 is a drawing illustrating generating a security policy of controlling program execution of an endpoint according to an embodiment of the inventive concept.

Referring to FIG. 4, a security policy associated with an execution program in an endpoint terminal may be generated as follows. A manager may input pieces of information about a program name, an electronic signature valid value, an electronic signer of a program included in a whitelist, which is executable in the endpoint terminal, and may generate the security policy associated with the program.

Meanwhile, the security policy may include blacklist information about network access in the endpoint terminal. In other words, the security policy may include a network address or domain information, access of which is limited in the endpoint terminal. However, the security policy is not limited thereto, and may include whitelist information about network access in the endpoint terminal. In this case, access in the endpoint terminal may be allowed to only a network included in the whitelist, that is, a domain address, or an IP address.

Figure 5:
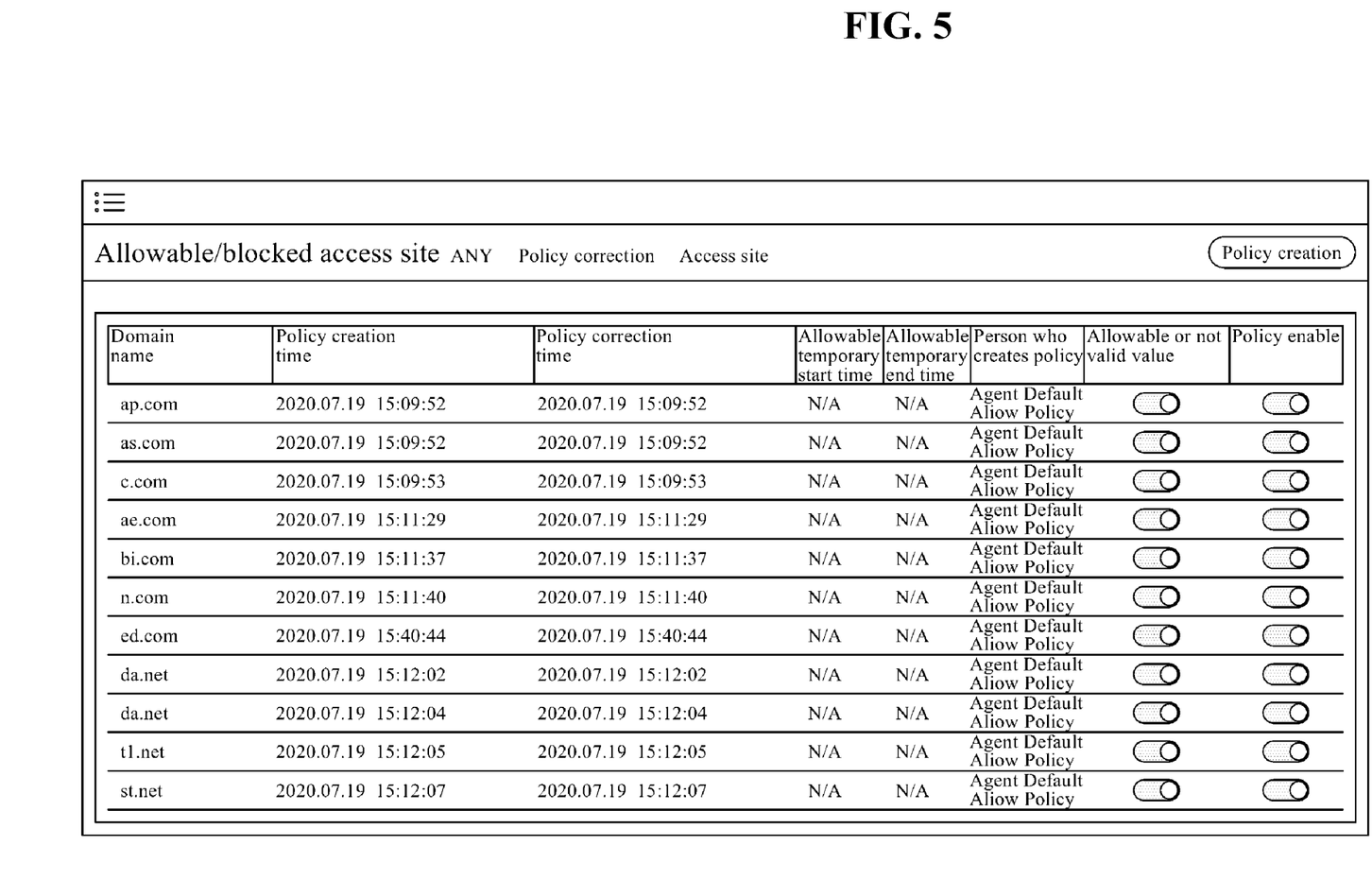
FIG. 5 is a drawing illustrating a security policy of controlling network access of an endpoint according to an embodiment of the inventive concept.

FIG. 5 is a drawing illustrating a security policy of controlling network access of an endpoint according to an embodiment of the inventive concept.

Seeing FIG. 5, the security policy may include pieces of information about a domain name (or an IP address) associated with network access in an endpoint terminal, a policy creation time, a policy correction time, a person who creates the policy, and the like.

Referring to FIG. 5, the security policy associated with network access in an endpoint terminal may be generated as follows. A manager may store information about whether access to a site which allows access is allowed and whether the policy is enabled, including information (e.g., a domain address, an IP address, or the like) about the site, thus generating a security policy associated with network access in the endpoint terminal.

Referring again to FIG. 2, in operation S120, the security policy may be applied to the control agent 200. In operation S130, the control agent 200 may control a real-time behavior in the endpoint terminal, based on the security policy.

As an example, the control agent 200 may control a real-time behavior about a process in the endpoint terminal based on a whitelist of the security policy.

In detail, only execution of a process about a program included in the whitelist of the security policy in the endpoint terminal may be allowed, and execution of a program which is not included in the whitelist may be limited by the control agent 200.

Furthermore, a security manager may receive information about an execution program in the endpoint terminal in real time from the security management server 100. As a result, after the endpoint terminal executes the program, behaviors after the process is generated may be monitored in real time.

Furthermore, the control agent 200 may control network access in the endpoint terminal based on a blacklist of the security policy.

In detail, the control agent 200 may limit access to a network included in the blacklist of the security policy in the endpoint terminal. At this time, a user or a worker of the endpoint may access a network which is not included in the blacklist. Meanwhile, a collection unit 120 of the security management server 100 may collect information associated with network access in the endpoint terminal in real time. The manager may receive the collected information via a communication unit 110 of the security management server 100. As a result, the manager may monitor behaviors, after a time point when a network access time in the endpoint terminal is performed, in real time.

Meanwhile, the predetermined security policy may be corrected according to a request of the user or the worker of the endpoint or may fail to be applied during a certain time.

Meanwhile, a controller 140 of the security management server 100 may collect information about a real-time behavior of the user, the worker, or the like in the endpoint terminal by means of the collection unit 120 and may detect whether the real-time behavior is a threat behavior based on a process behavior in the endpoint terminal, based on the collected information. The control agent 200 may control a threat behavior in the endpoint terminal based on the analyzed result of the controller 140.

Figure 6:
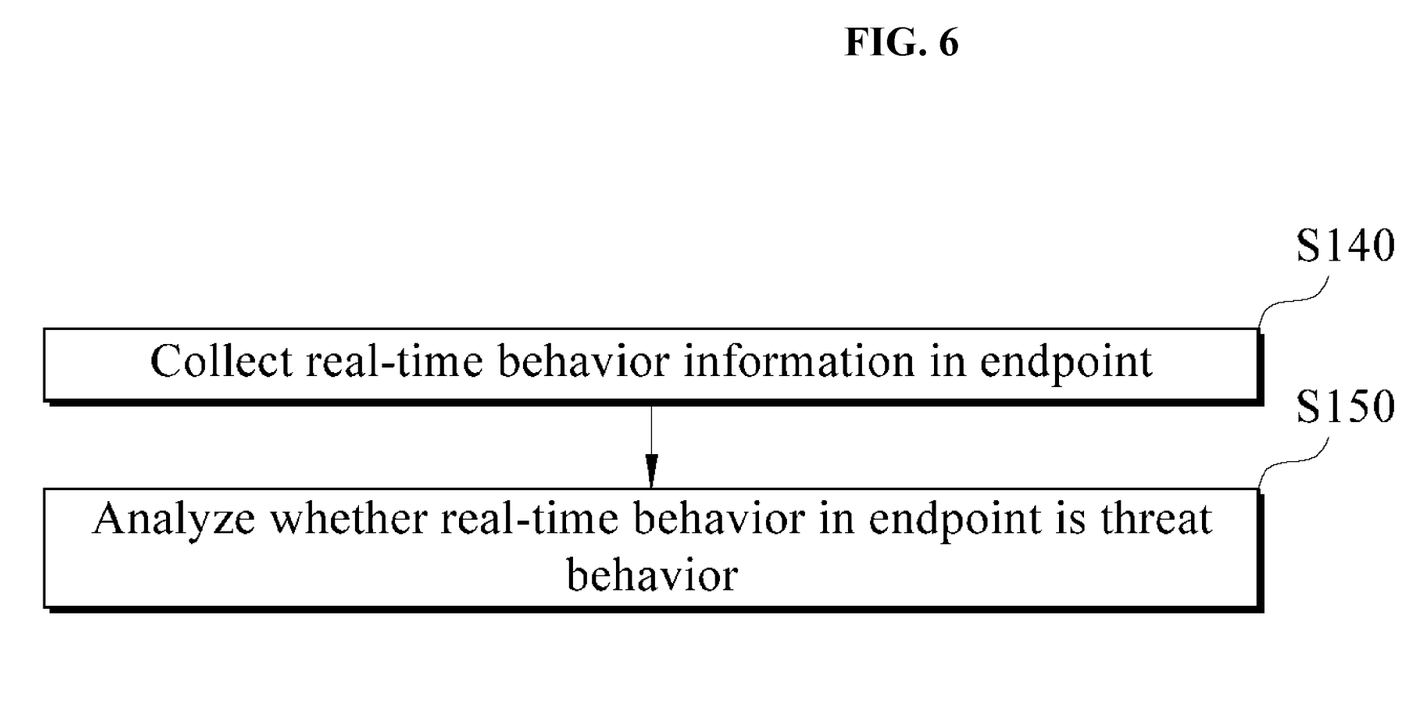
FIG. 6 is a flowchart illustrating a process of controlling a threat behavior based on real-time behavior information in an endpoint according to an embodiment of the inventive concept.

FIG. 6 is a flowchart illustrating a process of controlling a threat behavior based on real-time behavior information in an endpoint according to an embodiment of the inventive concept.

Referring to FIG. 6, first of all, in operation S140, a controller 140 of a security management server 100 of FIG. 1 may collect real-time behavior information in the endpoint by means of a collection unit 120 of FIG. 1.

In this case, the real-time behavior information in the endpoint may be real-time behavior information of a user or a worker by means of an endpoint terminal, which may be process information about a process executed by the user or the like and may particularly be information about a threat behavior based on program execution allowed by the above-mentioned security policy. However, the real-time behavior information in the endpoint is not limited thereto, and may be information about network access of a web site, a domain address, or the like which is not included in a blacklist associated with the network access, which is by the user or the like in the endpoint terminal.

Seeing FIG. 6 again, when the real-time behavior in the endpoint is collected, in operation S150, the controller 140 may analyze whether the real-time behavior in the endpoint terminal is a threat behavior.

In this case, the controller 140 may analyze whether the real-time behavior in the endpoint terminal corresponds to a behavior which threatens a security management system or the entire system. As a result, a periodic search of a threat behavior which occurs in the system is possible, and tracking for the threat behavior is also possible.

Meanwhile, when the real-time behavior in the endpoint terminal is detected as the threat behavior, a control agent 200 installed in the endpoint may control the real-time behavior corresponding to the threat behavior in the endpoint terminal.

As an embodiment of the inventive concept, the controller 140 may detect a threat behavior by means of a required program such as an operating system in the endpoint terminal, by means of a machine learning-based threat hunting technology.

In detail, a collection unit 120 of the security management server 100 may collect a real-time behavior of a user or a worker in the endpoint terminal. The controller 140 may analyze and detect whether the real-time behavior is a threat behavior for the security management system, based on the machine learning-based threat hunting technology. Particularly, the controller 140 may detect an abnormal behavior of an operating system level. In detail, the controller 140 may detect a behavior which threatens the security management system by means of an operating system of the endpoint, for example, a program such as Windows OS, MAC OS, Linux, or Unix.

It is impossible to generate a security policy for a process associated with the operating system of the endpoint. A security policy associated with executing the above-mentioned program may not be applied to the process associated with the operating system of the endpoint. This is because internal execution of the operating system in the endpoint terminal is limited. Therefore, the controller 140 may not apply the security policy to the process associated with the operating system of the endpoint and may detect an abnormal behavior of an operating system level on the endpoint, using the machine learning-based threat hunting technology, thus protecting the system.

In detail, the controller 140 may detect a malicious behavior, which occurs in the endpoint, in real time and may analyze and correspond to it, thus preventing the spread of damage. For example, the controller 140 may block a malicious code, ransomware, a virus, or information leakage. In addition, the controller 140 may effectively correspond to hacking which abuses a function of a program, execution of which is allowed by the security policy, using file-less, script-based attack, or the like, and 'Zero day Exploit'.

Meanwhile, although not clearly illustrated in the drawing, in an embodiment of the inventive concept, to use the above-mentioned machine learning-based threat hunting technology, the controller 140 may further include a machine learning module. Furthermore, the security management server 100 may further include a database unit which includes good-quality data used for the machine learning-based threat hunting.

Hereinafter, as described above, a description will be given of an embodiment of the inventive concept about an exception policy request of a user, a worker, or the like about a predetermined security policy.

Figure 7:
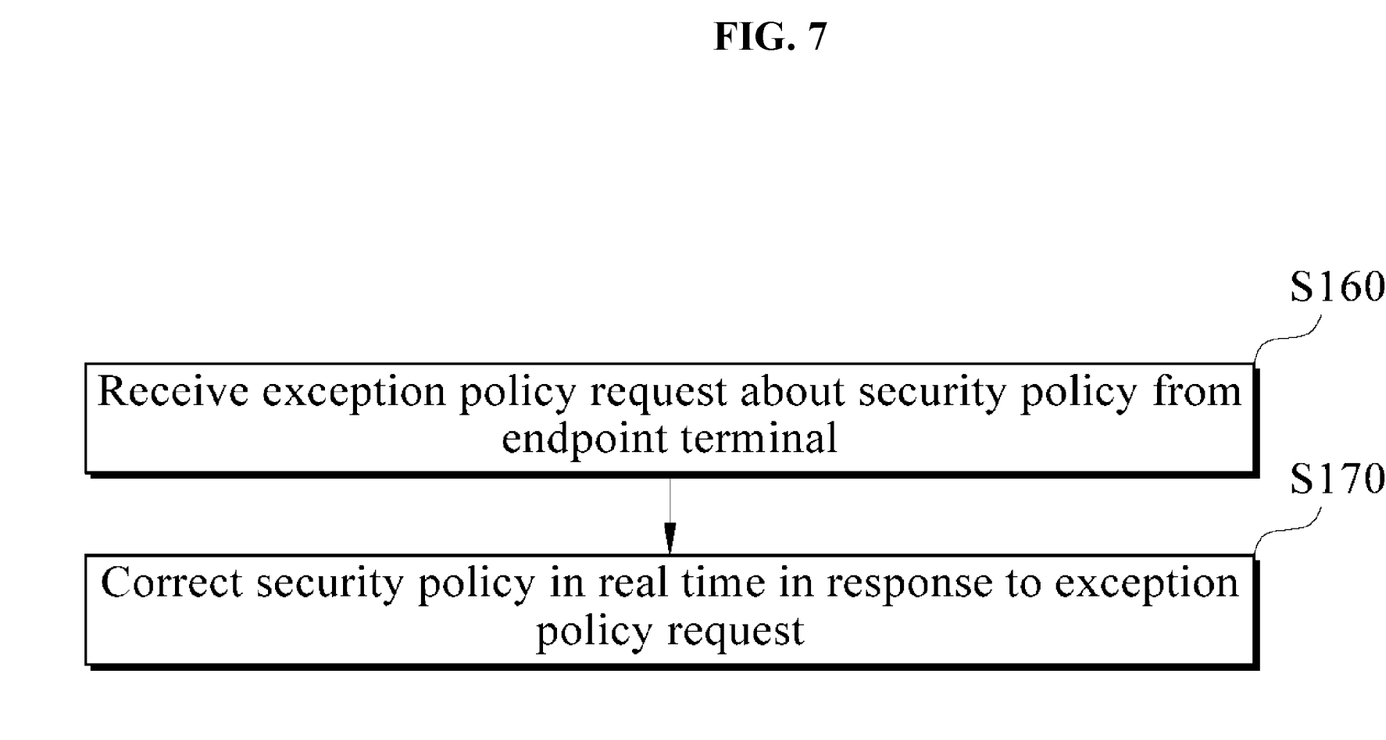
FIG. 7 is a flowchart illustrating a process of correcting a security policy based on a request of an endpoint according to an embodiment of the inventive concept.

FIG. 7 is a flowchart illustrating a process of correcting a security policy based on a request of an endpoint according to an embodiment of the inventive concept.

Figure 8:
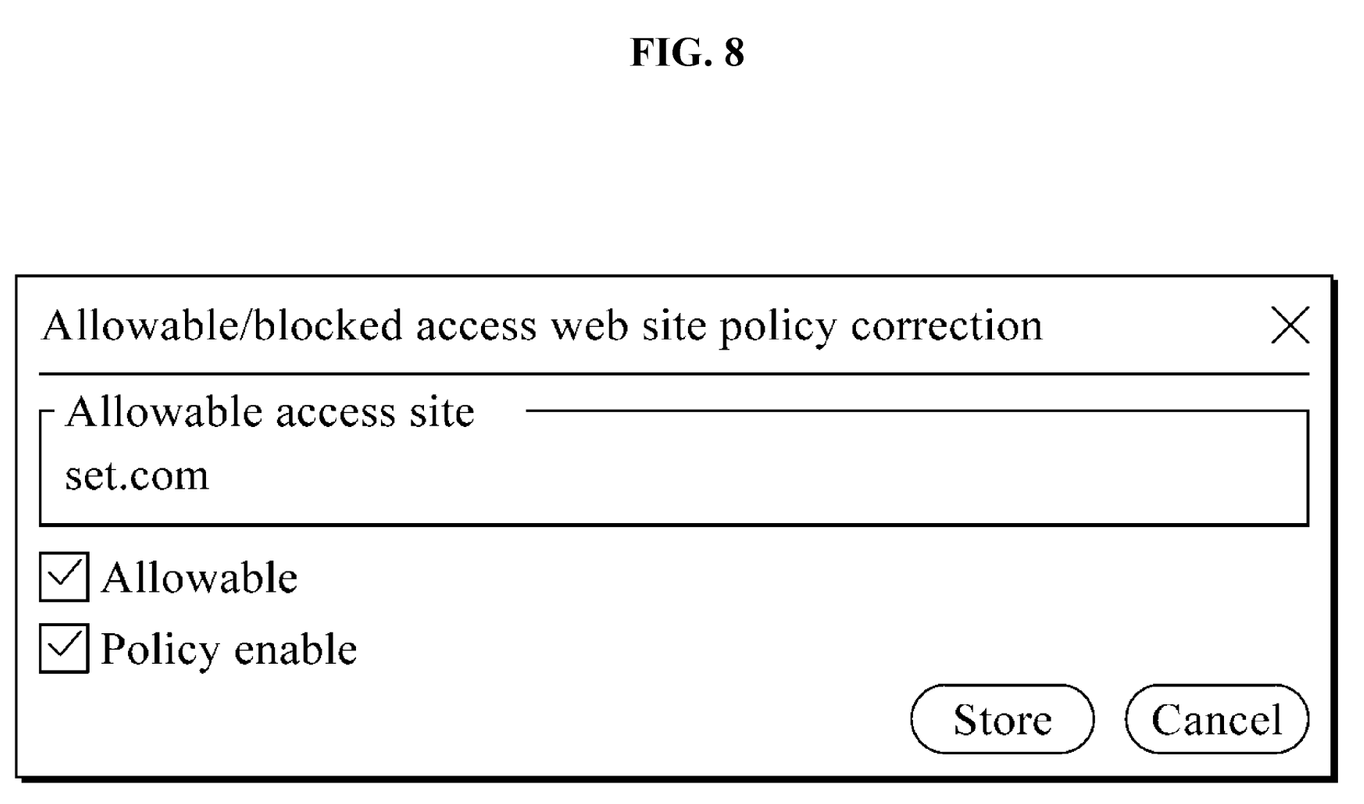
FIG. 8 is a drawing illustrating a process of correcting a security policy according to an embodiment of the inventive concept.

FIG. 8 is a drawing illustrating a process of correcting a security policy according to an embodiment of the inventive concept.

As an embodiment of the inventive concept, when an exception application request about a security policy applied in real time to each endpoint terminal is received from the endpoint terminal, a controller 140 of a security management server 100 of FIG. 1 may correct an existing security policy in real time based on the received request.

Referring to FIG. 7, first of all, when receiving an exception policy request about a security policy applied in real time to a corresponding endpoint terminal, that is, a request for the security policy not to be applied during a certain time or under a certain condition, from at least one endpoint terminal which communicates with the security management server 100 in operation S160, in operation S170, the controller 140 of the security management server 100 may correct the security policy in real time in response to the exception policy request. In this case, the corrected security policy may be applied to only a corresponding endpoint which inputs the exception policy request.

Meanwhile, based on the exception policy request of the security policy, the controller 140 of the security management server 100 may analyze whether the exception policy request causes a behavior which threatens the security management system.

Furthermore, to this end, although not clearly illustrated in the drawing, the controller 140 of the security management server 100 may use information about a program or a network which threatens the security management system, which is stored in a memory 130 of the security management server 100.

Meanwhile, the exception policy request associated with the security policy may include addition of the security policy about the program or the network as well as correction about the security policy applied in real time. For example, when requesting to add information of a program or a network determined as threatens the system on the endpoint to a blacklist of the security policy, the security management server 100 may take action of correcting the security policy in real time in response to the request.

Meanwhile, when a communication unit 110 of the security management server 100 receives the exception policy request of the security policy, the security policy may be corrected to correspond to the request by the manager and may be applied to the security management system. Seeing FIG. 8, when an exception application request of the security policy for "setting-sin.data.microsoft.com" is input from the endpoint terminal, whether the request is allowed by the manager and the policy may be disabled.

Meanwhile, in the above-mentioned description, operations S110 to S170 may be further divided into additional operations or may be combined into fewer operations. Furthermore, some operations may be omitted if necessary, and an order between operations may be changed. In addition, although there are other omitted contents, the above-mentioned contents of FIG. 1 are applicable to the security management method for the remote working environment in FIGS. 2, 6, and 7.

The above-mentioned security management method for the remote working environment according to an embodiment of the inventive concept may be combined with a computer which is hardware and may be stored in a computer-readable storage medium to be implemented as a program (or application) to be executed.

For the computer to read the program and execute the methods implemented with the program, the above-mentioned program may include a code coded into a computer language such as C, C++, Java, Ruby, or a machine language readable through a device interface of the computer by one or more processors (CPUs) of the computer. Such a code may include a functional code associated with a function and the like defining functions necessary for executing the methods and may include a control code associated with an execution procedure necessary for the one or more processors of the computer to execute the functions according to a certain procedure. Further, such a code may further include a code associated with memory reference about whether additional information or media necessary for the one or more processors of the computer to execute the functions is referred at any location (address number) of an internal or external memory of the computer. Further, if it is necessary for the one or more processors of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semipermanent basis rather than a medium, such as a register, a cache, or a memory, which stores data during a short moment. The medium may refer to a device-readable medium which stores data on a semipermanent basis rather than a medium, such as a register, a cache, or a memory, which stores data during a short moment. In other words, the program may be stored in various storage media on various servers accessible by the computer or various storage media on the computer of the user. Further, the medium may be distributed to a computer system connected over a network and may store a computer-readable code on a distributed basis.

The description of the inventive concept is for the purpose of illustration, it will be apparent to those skilled in the art that various changes and modifications may be made without departing from the spirit and scope of the inventive concept. Therefore, it should be understood that the above embodiments are not limiting, but illustrative. For example, each constituent element described in a singular type may be embodied to be distributed, and constituent elements described as being distributed may be embodied in a coupled type likewise.

According to embodiments of the inventive concept, the security management system may monitor and track a behavior of an endpoint in real time after a time point when process execution or network access is performed.

Furthermore the security management system may monitor a behavior of an operating system level on the endpoint to which the security policy is not applied in real time to detect a behavior which threatens the security management system and may control the endpoint.

Furthermore, the security management system may correct and manage the security policy in response to a request about exception application of a predetermined security policy in real time to flexibly perform security management of the endpoint.

The effects of the inventive concept are not limited to the above-described effects and other effects which are not described herein will become apparent to those skilled in the art from the following description.

The scope of the inventive concept is represented by Claims to be described below rather than Detailed Description, and it should be interpreted that the meaning and scope of Claims and all modifications or modified forms derived from equivalent concept thereof are included in the scope of the inventive concept.

What is claimed is:

1. A security management system for a remote working environment to manage a threat behavior of an endpoint in the remote working environment, the security management system comprising:
a security management server; and
a control agent configured to control a behavior in an endpoint terminal, based on information associated with a security policy provided from the security management server,
wherein the security management server includes:
a collection unit configured to collect information associated with a behavior in at least one endpoint terminal;
a memory configured to store and manage the security policy; and
a controller configured to apply the security policy stored in the memory to the control agent and determine whether the behavior in the endpoint terminal is a threat behavior based on the collected information, and
wherein the control agent controls the behavior about a process in the endpoint terminal based on a whitelist of the security policy and controls network access in the endpoint terminal based on a blacklist of the security policy,
wherein the whitelist includes information about a name of a program allowed to be executed in the endpoint terminal, and the blacklist includes a network address or domain information, access of which is limited in the endpoint terminal, wherein the control agent allows only execution of a process about a program included in the whitelist of the security policy and limits execution of a program which is not included in the whitelist, and the security management server receives information about an executed program in the endpoint terminal, wherein the control agent limits access to a network which is included in the blacklist of the security policy in the endpoint terminal, and allows access to a network which is not included in the blacklist of the security policy, and the security management server receives information about network access in the endpoint terminal, wherein the controller is configured not to apply the security policy to a process of an operating system of the endpoint terminal itself, wherein the controller is configured not to limit an internal execution of the operating system in the endpoint terminal, and wherein the controller is configured is configured to detect a threat behavior through the operating system of the endpoint terminal by means of a machine learning-based threat hunting technology.

2. The security management system of claim 1, wherein the controller analyzes whether the behavior in the endpoint terminal is a threat behavior based on a process behavior in the endpoint terminal, based on the collected information.

3. The security management system of claim 2, wherein the control agent controls a threat behavior in the endpoint terminal based on the analyzed result of the controller.

4. The security management system of claim 1, wherein the collection unit collects a behavior pattern associated with a domain generation algorithm (DGA) in the endpoint terminal, based on a DGA detection algorithm.

5. The security management system of claim 1, wherein the controller corrects an existing security policy based on a received exception policy request, when the exception policy request about the security policy is received from the endpoint terminal.

6. A security management method for a remote working environment, the security management method performed by a server comprising:

presetting a security policy associated with control of a behavior in an endpoint terminal;

applying the security policy to a control agent; and controlling the behavior in the endpoint terminal, based on the security policy, wherein the security policy includes a whitelist associated with a behavior about a process in the endpoint terminal and a blacklist about a network in the endpoint terminal, and wherein the controlling includes:

controlling the behavior about the process in the endpoint terminal based on the whitelist of the security policy and controlling network access in the endpoint terminal based on the blacklist of the security policy, wherein the whitelist includes information about a name of a program allowed to be executed in the endpoint terminal, and the blacklist includes a network address or domain information, access of which is limited in the endpoint terminal, wherein the controlling comprises:

allowing, by the control agent, only execution of a process about a program included in the whitelist of the security policy, limiting, by the control agent, execution of a program which is not included in the whitelist, and receiving, by a security management server, information about an executed program in the endpoint terminal;

limiting, by the control agent, access to a network which is included in the blacklist of the security policy in the endpoint terminal, allowing, by the control agent, access to a network which is not included in the blacklist of the security policy, and receiving, by the security management server, information about network access in the endpoint terminal;

not applying the security policy to a process of an operating system of the endpoint terminal itself;

not limiting an internal execution of the operating system in the endpoint terminal; and detecting a threat behavior through the operating system of the endpoint terminal by means of a machine learning-based threat hunting technology.

7. The security management method of claim 6, further comprising:

collecting behavior information in an endpoint; and analyzing whether a behavior in the endpoint terminal is a threat behavior, based on the collected behavior information.

8. The security management method of claim 7, wherein the collecting includes:

collecting a behavior pattern associated with a domain generation algorithm (DGA) in the endpoint terminal, based on a DGA detection algorithm.

9. The security management method of claim 7, wherein the controlling includes:

controlling a behavior corresponding to a threat behavior in the endpoint terminal based on the analyzed result.

10. The security management method of claim 6, further comprising:

receiving an exception policy request about the security policy from the endpoint terminal; and correcting the security policy in in response to the exception policy request.

11. A non-transitory computer-readable recording medium storing a computer program, and configured to be coupled to a computer hardware, the program includes instructions to execute a plurality of processes for security management for a remote working environment, wherein the plurality of processes include:

a first process configured to preset a security policy associated with control of a behavior in an endpoint terminal;

a second process configured to apply the security policy to a control agent; and a third process configured to control the behavior in the endpoint terminal, based on the security policy, wherein the security policy includes a whitelist associated with a behavior about a process in the endpoint terminal and a blacklist about a network in the endpoint terminal, and wherein the third process controls the behavior about the process in the endpoint terminal based on the whitelist of the security policy and controls network access in the endpoint terminal based on the blacklist of the security policy, wherein the whitelist includes information about a name of a program allowed to be executed in the endpoint terminal, and the blacklist includes a network address or domain information, access of which is limited in the endpoint terminal, wherein the third process further comprises:

allowing, by the control agent, only execution of a process about a program included in the whitelist of the security policy, limiting, by the control agent, execution of a program which is not included in the whitelist, and receiving, by a security management server, information about an executed program in the endpoint terminal;

limiting, by the control agent, access to a network which is included in the blacklist of the security policy in the endpoint terminal, allowing, by the control agent, access to a network which is not included in the blacklist of the security policy, and receiving, by the security management server, information about network access in the endpoint terminal;

not applying the security policy to a process of an operating system of the endpoint terminal itself;

not limiting an internal execution of the operating system in the endpoint terminal; and detecting a threat behavior through the operating system of the endpoint terminal by means of a machine learning-based threat hunting technology.

12. The non-transitory computer-readable recording medium of claim 11, wherein the plurality of processes further include:

a fourth process configured to collect behavior information in an endpoint; and a fifth process configured to analyze whether a behavior in the endpoint terminal is a threat behavior, based on the collected behavior information.

13. The non-transitory computer-readable recording medium of claim 12, wherein the fourth process collects a behavior pattern associated with a domain generation algorithm (DGA) in the endpoint terminal, based on a DGA detection algorithm.

14. The non-transitory computer-readable recording medium of claim 12, wherein the third process controls a behavior corresponding to a threat behavior in the endpoint terminal based on the analyzed result.

15. The non-transitory computer-readable recording medium of claim 11, wherein the plurality of processes further include:

a sixth process configured to receive an exception policy request about the security policy from the endpoint terminal; and a seventh process configured to correct the security policy in response to the exception policy request.

* * * * *